(12) United States Patent
Levandowski

(10) Patent No.: US 6,704,060 B2
(45) Date of Patent: Mar. 9, 2004

(54) METHOD AND APPARATUS FOR VIEWING TWO INDEPENDENT CHANNELS USING ONE INTEGRATED RECEIVER/DECODER

(75) Inventor: Mark C. Levandowski, Roslyn, PA (US)

(73) Assignee: Matsushita Electric Industrial Co., Ltd., Osaka (JP)

(*) Notice: Subject to any disclaimer, the term of this patent is extended or adjusted under 35 U.S.C. 154(b) by 422 days.

(21) Appl. No.: 09/933,351

(22) Filed: Aug. 20, 2001

(65) Prior Publication Data

US 2002/0130973 A1 Sep. 19, 2002

Related U.S. Application Data

(60) Provisional application No. 60/275,893, filed on Mar. 15, 2001.

(51) Int. Cl.[7] .............................. H04N 5/44; H04N 7/20
(52) U.S. Cl. ..................... 348/725; 348/552; 725/70; 725/81; 725/139
(58) Field of Search ................. 348/553, 554, 348/555, 725, 726, 552, 588, 584, 598, 599, 727, 728; 725/71, 68, 70, 69, 81, 80, 131, 139, 151; H04N 5/44, 5/46, 5/455, 9/74, 7/18, 7/20

(56) References Cited

U.S. PATENT DOCUMENTS

| | | | |
|---|---|---|---|
| 5,359,367 A | 10/1994 | Stockill | |
| 5,613,191 A | 3/1997 | Hylton et al. | |
| 5,708,961 A | 1/1998 | Hylton et al. | |
| 5,920,626 A * | 7/1999 | Durden et al. | 725/146 |
| 6,078,348 A * | 6/2000 | Klosterman et al. | 725/131 |
| 6,157,673 A | 12/2000 | Cuccia | |
| 6,285,408 B1 | 9/2001 | Choi et al. | |
| 6,493,873 B1 * | 12/2002 | Williams | 725/71 |

FOREIGN PATENT DOCUMENTS

| | | |
|---|---|---|
| EP | 0 952 734 A2 | 10/1999 |
| EP | 0 966 157 A1 | 12/1999 |
| WO | WO 00/72596 A1 | 11/2000 |

OTHER PUBLICATIONS

European Search Report, Apr. 11, 2003.

\* cited by examiner

Primary Examiner—Sherrie Hsia
(74) Attorney, Agent, or Firm—RatnerPrestia

(57) ABSTRACT

An integrated receiver/decoder (IRD) allows independent, simultaneous viewing of two channels with a relatively small increase in unit cost over an IRD that receives and displays only a single channel. The IRD is controlled by first and second remote control devices to display one program on a display device local to the IRD and to modulate and transmit the second television signal to a remote television receiver for independent viewing on another display.

15 Claims, 3 Drawing Sheets

METHOD AND APPARATUS FOR VIEWING TWO INDEPENDENT CHANNELS USING ONE INTEGRATED RECEIVER/DECODER

This application claims the benefit of U.S. Provisional Patent Application No. 60/275,893, filed Mar. 15, 2001, the contents of which are incorporated herein by reference.

TECHNICAL FIELD

The present invention relates, in general, to integrated receivers/decoders for receiving digital and analog television signals and, more specifically, to integrated receivers/decoders that are configured to provide two independent signals for display on two television receivers.

BACKGROUND OF THE INVENTION

A typical integrated receiver/decoder (IRD) may be compatible with high definition (HD) monitors, digital television (DTV) and standard analog NTSC (National Television Systems Committee) television. Typical reception capabilities of an IRD may include standard definition (SD) and high definition (HD) satellite streams, standard analog cable, NTSC terrestrial and ATSC (Advanced Television Systems Committee) terrestrial streams.

The IRD typically receives an RF (radio frequency) signal by using a different tuner for satellite reception and terrestrial reception. Next, a demodulator extracts the signal from the RF carrier and sends it to a decoder. Digital signals are send as transport streams to the decoder. One known decoder, such as the Sti5514 integrated circuit manufactured by ST Microelectronics, Geneva, Switzerland, may process multiple transport streams from different sources. For example, two satellite streams from two independent tuners may be processed by the decoder, or one satellite stream and one ATSC stream may be processed. The Sti5514 may decode up to three transport streams simultaneously.

Under normal operation, one transport stream is decoded and separated into one video signal and one audio signal for viewing on a monitor or television display. Since typically the television is located in the same room as the IRD, a satellite TV subscriber may view the received signal in the same room. In case the subscriber wishes to watch television at a second location, two choices are available. First, the output signal from the IRD may be sent via cable to the second location for viewing. A disadvantage of this method is that both viewing locations must watch the same channel. Another available choice is to purchase a second IRD and install it at the second location. This choice, however, also requires installing coaxial cable from the satellite dish to the second location.

As both choices have shortcomings, a need exists to provide an IRD that is configured to provide two independent signals for viewing on two television displays located at different locations.

SUMMARY OF THE INVENTION

To meet this and other needs, and in view of its purposes, the present invention is directed to an integrated receiver/decoder, disposed at a local location. The integrated receiver/decoder includes at least one tuner for receiving and demodulating at least first and second transmitted digital television signals. Also included is a transport decoder, which is responsive to the demodulated digital television signals, and provides first and second digital television bit-streams. Also included is a first digital television decoder, which is responsive to the first digital television bit-stream, and provides first audio and video signals to a first display device. Also included is a second digital television decoder, which is responsive to the second digital television bit-stream, and provides a baseband television signal. A local transmitter, which modulates a carrier signal with the baseband television signal, transmits the modulated carrier signal to a remote location.

A remote receiver, at the remote location, recovers the baseband television signal from the modulated carrier signal and provides the recovered signal for viewing on a remote display, which is co-located with the remote receiver.

The integrated receiver/decoder may be controlled by two independent viewers. One viewer uses a remote control transmitter, at the remote location, to control the integrated receiver/decoder. Another viewer uses another remote control transmitter, preferably an infrared transmitter, to control the integrated receiver/decoder. In this manner, two independent signals may be displayed on two separate displays.

It is understood that the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures.

DETAILED DESCRIPTION OF THE INVENTION

Figure 1:
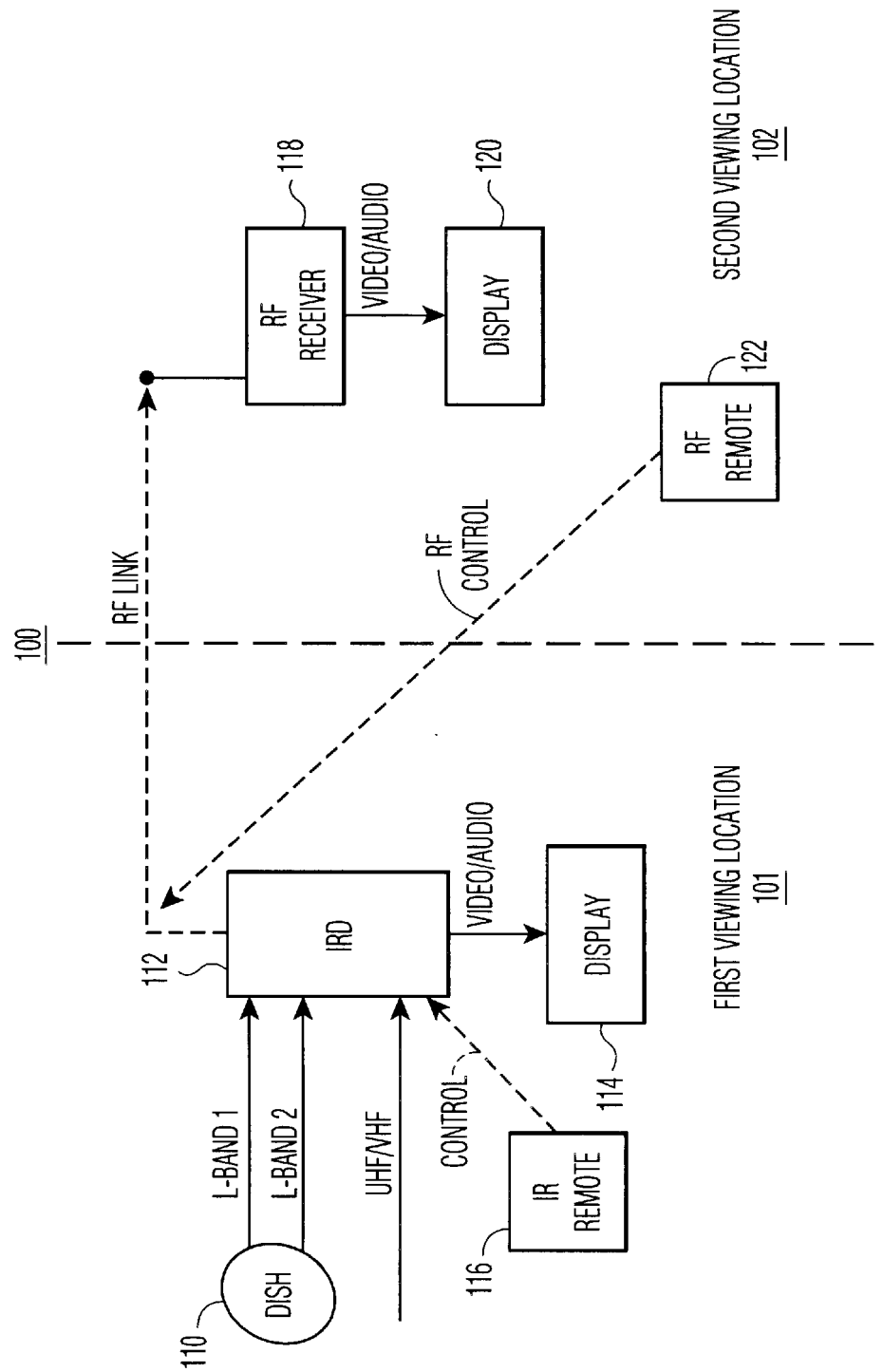
FIG. 1 is a diagrammatic block diagram of a system for viewing two independent channels at two locations using one integrated receiver/decoder (IRD) in accordance with one embodiment of the present invention.

In accordance with one embodiment of the present invention, FIG. 1 shows a diagrammatic block diagram of a system for viewing two independent channels using one integrated receiver/decoder (IRD). The system, generally designated 100, includes IRD 112 receiving UHF/VHF television signals from cable or terrestrial broadcast stations, decoding the signals, and displaying video/audio of one decoded television signal on display 114. IRD 112 also receives two independent L-band 1 and L-band 2 satellite signals by way of satellite dish 110. IRD 112 is controlled by IR (infrared) remote 116 by a viewer. As known, IR remote 116 controls IRD 112 when in direct line-of-sight with an IR sensor (not shown) located in IRD 112. As shown, IRD 112, display 114 and IR remote 116 are located at a first viewing location 101.

Located at a second viewing location 102, system 100 includes RF receiver 118, display 120 and RF remote 122. As will be explained, RF receiver 118 receives a second television signal from IRD 112 by way of an RF link. Receiver 118 decodes the second television signal and provides video/audio to display 120. A viewer at location 102 controls selection of the television signal for viewing on display 120 by way of RF remote 122.

In one embodiment of FIG. 1, the RF link between IRD 112 and RF receiver 118, and the RF control between RF remote 122 and IRD 112 may be at a UHF frequency, such as 900 MHz. In another embodiment of FIG. 1, the RF link and RF control may be at a frequency provided by a wireless/home network link. This frequency may be in the commercial unlicensed band.

Figure 2:
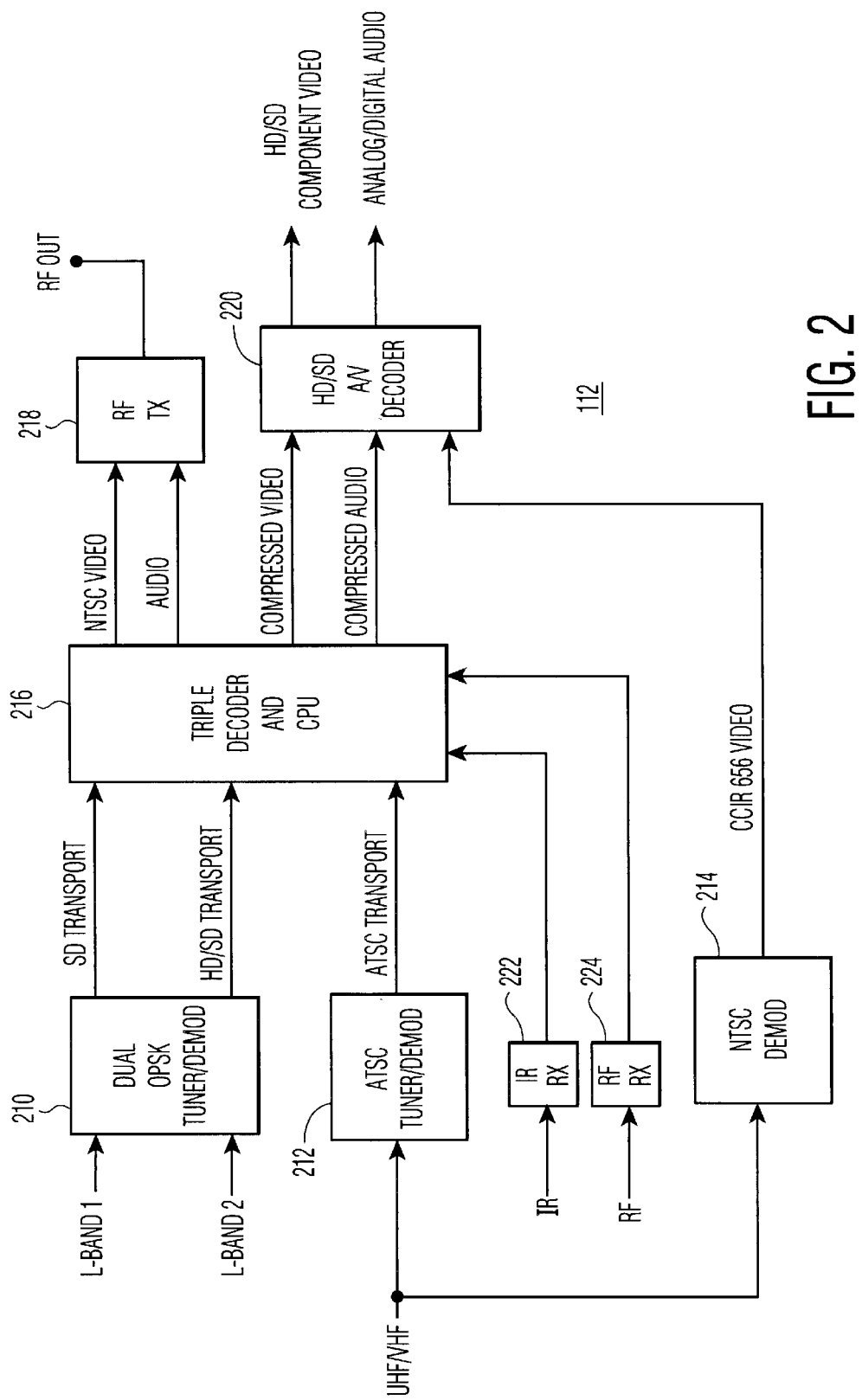
FIG. 2 is a block diagram of an IRD in accordance with an embodiment of the present invention.

FIG. 2 is a block diagram showing details of IRD 112 in accordance with an embodiment of the invention. IRD 112 receives two television signals, L-band 1 and L-band 2 from a satellite dish and demodulates these signals in a dual quadrature phase shift key (QPSK) tuner/demodulator 210. Two transport streams, a standard definition transport stream (SD transport) and a high-definition/standard-definition transport stream (HD/SD transport) to triple transport decoder 216. IRD 112 also receives broadcast or cablecast television signals at tuner/demodulator 212 that conform to the trellis coded vestigial sideband transmission standard specified by the Advanced Television Systems Committee (ATSC). The demodulated ATSC signal, as well as the demodulated satellite signals are transport data streams that conform to a subset of the transport standard specified by the Moving Pictures Experts Group (MPEG). Finally, as shown, IRD 112 receives analog television signals via a conventional television demodulator 214 (e.g. an NTSC demodulator).

The transport streams generated by demodulators 210 and 212 are applied to a triple transport decoder 216 which may be, for example, a Sti5514 integrated circuit manufactured by STMicroelectronics, Geneva, Switzerland. The transport decoder 216 concurrently processes three transport streams into respective MPEG or ATSC bit-streams. One of the three bit-streams is decoded internally by the triple transport decoder 216 to provide a standard-definition television signal, NTSC video and a corresponding audio signal. Another of the three transport streams is provided to an external high-definition/standard-definition (HD/SD) television signal decoder 220. Decoder 220 may be, for example, a Sti7020 integrated circuit, also manufactured by STMicroelectronics.

The standard definition television signal (e.g. a CCIR 656 television signal) is provided by analog demodulator 214 to the HD/SD television signal decoder 220. Decoder 220 decodes the digital television signals provided by the transport decoder 216 to provide high-definition or standard-definition video signals and associated audio signals. The decoder 220 also decodes the analog television signal to provide output video and audio signals. The video and audio signals provided by decoder 220 are applied to display device 114, shown in FIG. 1.

The standard definition video and audio signals provided by transport decoder 216 are applied to RF transmitter 218 (e.g. a Ultra-High Frequency (UHF) transmitter that transmits at a frequency of, for example, 900 MHz). This signal is broadcast to UHF receiver 118, shown in FIG. 1, that is connected to the remote television display device 120.

The IRD shown in FIG. 2 also includes infrared receiver 222 and RF receiver 224 that receive control commands from the infrared remote control device 116 and the RF remote control device 122, shown in FIG. 1. These commands are applied to two data input ports of transport decoder 216. Transport decoder 216 includes a central processing unit (CPU) that controls the operation of tuner/demodulators 210 and 212, tuner 214 and HD/SD audio/video decoder 220.

Using the infrared remote control device 116, a viewer watching display device 114 controls IRD 112 to tune and display any television signal that can be received by IRD 112, whether it is a high-definition signal or a standard definition signal. In the exemplary embodiment of the invention, the RF remote control device 122 is used by a viewer watching television display device 120 to cause IRD 112 to display standard definition digital television programs, received by IRD 112 from either satellite dish 110, a terrestrial antenna (not shown) or a digital cable connection (not shown). These television signals include both video and audio components.

Although not shown in FIG. 2, it is contemplated that the analog television signal provided by demodulator 214 may also be provided to RF transmitter 218. If the television display device 120, shown in FIG. 1, however, is a conventional analog television receiver, it may receive these signals directly and does not need to receive them through IRD 112.

It is also contemplated that transport decoder 216 may decode high-definition television signals directly to provide either HDTV or SDTV signals to RF transmitter 218. Alternatively, transport decoder 216 may provide a transport stream or an MPEG or ATSC bit-stream to transmitter 218 for transmission to a remote digital television receiver 120.

It is contemplated that other alternative embodiments of the invention may be practiced. In one alternate embodiment, radio frequency transmitter 218 and radio frequency receiver 118 are replaced by an infrared transmitter (not shown) and an infrared receiver (not shown). In this alternative embodiment, the RF remote control device may also be replaced by an infrared remote control device that operates according to a protocol that is different from the protocol used by the infrared remote control device 116.

In another alternative embodiment of the invention, radio frequency transmitter 218 and radio frequency receiver 118 may be a wireless/home network link using a frequency in the commercial unlicensed band.

It will be appreciated that current state of the art transport decoder chips, such as the Sti5514, are highly integrated devices. Besides the transport decoder used to separate the incoming packetized data, they also contain general purpose Central Processing Units (CPUs) used to control general operation of the IRD, such as access to external volatile and non-volatile memory, standard definition MPEG (Motion Pictures Experts Group) audio and video decoders, On Screen Display (OSD) graphic generators, and other ancillary peripherals. Because of the difficulty in decoding high definition images, high definition decoders are typically implemented as separate devices independent of the transport decoder. One such example is the Sti7020 integrated circuit.

In the standard implementation, video (SD and/or HD) and audio packets are separated from the incoming data streams by the transport decoder. This is done by detecting the Packet Identification (PID) information located in the packet header. Both video and audio information are sent to temporary First In First Out (FIFO) storage buffers located in memory chips connected to the transport decoder. These separated streams are known as packetized elementary streams (PES) since they only contain one type of data, e.g. audio, video, etc. From the temporary FIFO's, the video and audio PES packets are sent to their respective decoders via a data bus. Because of the necessity of being able to decode high definition images, the video and audio packets are routed to an external high definition video/audio decoder (the Sti7020 for example). In the embodiment shown in FIG. 2, the standard definition video/audio decoders located in triple decoder 216 are unused.

After decoding the video, graphical OSD is added as necessary. For example, program guide information or other text/graphics are overlaid on the video images. Next, the digital data representing each individual pixel is converted to a corresponding analog voltage by a digital to analog (D/A) converter, and synchronization information, used by the television/monitor to properly display the image, is also added to the analog waveform. The analog voltages are then buffered and sent to the television/monitor.

In the exemplary embodiment, the standard definition video/audio decoders located in triple decoder 216 are used to decode a second, independent video/audio stream. A second, independent graphical OSD is also available by using the OSD generation located in the triple decoder. The second video/audio stream is processed similarly to the primary video/audio stream, except that the processing takes place internally in the triple decoder. The analog video/audio output from the triple decoder is applied to RF transmitter 218 and then sent to the remotely located RF receiver 118. The RF receiver demodulates the signal from the RF transmitter and generates the video/audio signals required by the second television/monitor 120. The cost of the RF transmitter and receiver is a small fraction of the cost of a second IRD, and since the interface is wireless, no new coaxial cable needs to be installed.

Control of a typical IRD is via a handheld remote control, using infrared light modulated with command and control data. While having the advantage of being inexpensive and reliable, IR remotes only work when the IRD is within line of sight of the remote control unit. By providing a handheld remote control that operates via RF, command and control data can be transmitted from room to room through walls, allowing for viewing of an independent channel at a remote location.

Figure 3:
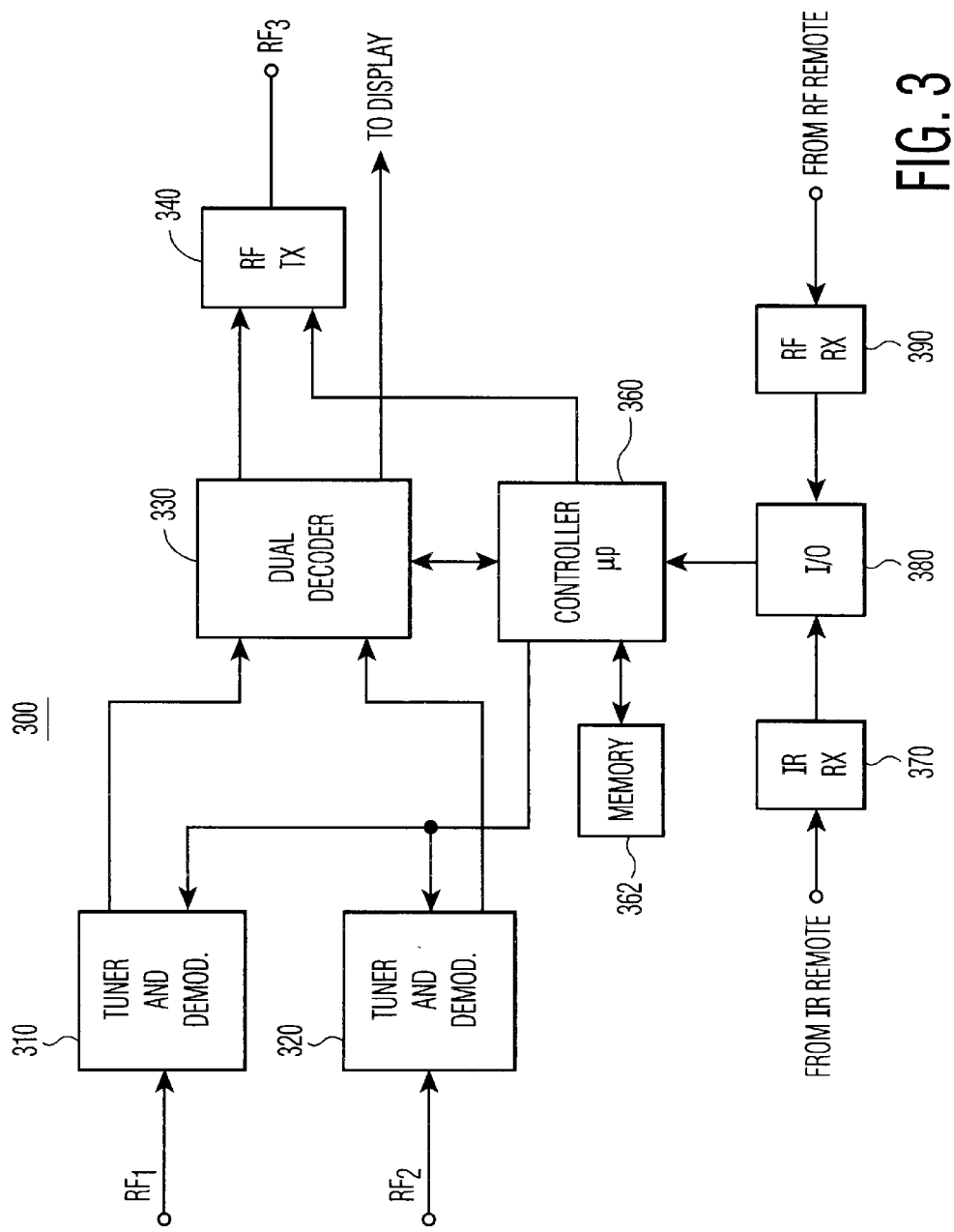
FIG. 3 is a block diagram of an IRD in accordance with another embodiment of the present invention.

In yet another embodiment, IR 300 is shown in FIG. 3. Different from the IRD shown in FIG. 2, IRD 300 includes dual decoder 330 for decoding two separate demodulated signals received, respectively, from tuner/demodulators 310 and 320. Each tuner/demodulator may be tuned to receiving signals $RF_1$ and $RF_2$, broadcast from terrestrial or satellite stations. Dual decoder 330 may sent an audio/video signal, decoded from the $RF_1$ signal, to RF transmitter 340 for further transmission as $RF_3$ or for viewing at a local display. Alternatively, dual decoder 330 may sent an audio/video signal, decoded from the $RF_2$ signal, to RF transmitter 340 for further transmission as $RF_3$ or for viewing at the local display. In the exemplary embodiment of the invention, the dual decoder 330 may be, for example, a BCM7041 integrated circuit, available from Broadcom.

As shown, microprocessor 360 controls the operation of the tuner/demodulators, the dual decoder and the RF transmitter. Decoded data may be stored in memory 362. A viewer may locally control IRD 300, similarly to IRD 112, by way of IR receiver 370. Another viewer, at a second location, may remotely control IRD 300, by way of RF receiver 390. Each receiver is connected to microprocessor 360 by way of input/output device 380.

Although the invention is described as being implemented entirely in hardware, it is contemplated that parts of the invention may be implemented in software and that the entire invention may be implemented in the context of a personal computer. For example, the decoding of the transport streams into bit-streams, the selection of one or more bit-streams to be decoded and the decoding of the selected bit-streams may all be implemented in software on a general purpose computer. This software may be embodied in an article of manufacture such as a magnetic or optical disc, memory card or modulated radio-frequency or audio-frequency carrier wave. The exemplary computer software may be used in a computer system having one or more tuners capable of receiving signals representing at least two television programs. The separate signals may be displayed on first and second monitors coupled to the computer system and the computer system may be controlled using first and second pointing devices (e.g. mice) coupled to the computer. The separate tasks performed by the computer system may be separate threads of a multi-threaded system.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. An integrated receiver/decoder comprising:
    at least one tuner for receiving and demodulating at least first and second transmitted digital television signals;
    a transport decoder, responsive to the demodulated digital television signals, for providing first and second digital television bit-streams;
    a first digital television decoder, responsive to the first digital television bit-stream for providing first audio and video signals to a first display device;
    a second digital television decoder, responsive to the second digital television bit-stream for providing a baseband television signal; and
    a local transmitter which modulates a carrier signal with the baseband television signal and transmits the modulated carrier signal to a remote location.

2. The integrated receiver/decoder of claim 1 including a remote receiver, at the remote location, which recovers the baseband television signal from the modulated carrier signal.

3. The integrated receiver/decoder of claim 1 including a remote receiver, at the remote location, which recovers the baseband television signal from the modulated carrier signal, and
    a remote control transmitter, at the remote location, which controls at least the transport decoder for providing the baseband television signal and the remote receiver for recovering the baseband television signal.

4. The integrated receiver/decoder of claim 3 wherein the local transmitter, remote receiver and remote control transmitter operate at a UHF frequency in a commercial licensed frequency band.

5. The integrated receiver/decoder of claim 3 wherein the local transmitter, remote receiver and remote control transmitter operate at a frequency in a commercial unlicensed band used by wireless/network links.

6. The integrated receiver/decoder of claim 1 in which the transport decoder and the second digital television decoder are included in a single integrated circuit.

7. The integrated receiver/decoder of claim 1 in which the transport decoder and the second digital television decoder are included in a first integrated circuit, and the first digital television decoder is included in a second integrated circuit, separate from the first integrated circuit.

8. A method of viewing television signals comprising the steps of:
    (a) receiving and demodulating at least first and second transmitted digital television signals into first and second digital television bit-streams;
    (b) decoding the first digital television bit-stream into first audio and video signals;

(c) decoding the second digital television bit-stream into a baseband television signal;
(d) displaying the first video signal decoded in step (b) on a local display;
(e) transmitting the baseband television signal decoded in step (c) to a remote location for display.

9. The method of claim 8 including the step of:
(f) receiving the signal transmitted in step (e) using a remote receiver and recovering the baseband television signal for display.

10. The method of claim 9 in which step (d) includes controlling the displayed first video signal by a first viewer; and
step (f) includes controlling the displayed signal by a second viewer, the control by the second viewer being independent of the control by the first viewer.

11. The method of claim 8 in which step (a) includes controlling the first and second transmitted digital television signals from the remote location.

12. The method of claim 8 in which step (a) includes controlling the first and second transmitted digital television signals from the remote location, and independently controlling the first and second transmitted digital television signals from a local location at the local display.

13. The method of claim 12 in which
controlling the first and second transmitted digital television signals from the remote location includes transmitting a remote UHF control signal to the local location, and
independently controlling the first and second transmitted digital television signals from the local location includes transmitting an infrared control signal from the local location.

14. The method of claim 8 in which step (a) includes receiving and demodulating at least first and second transmitted digital television signals from a set of signals including L-band 1, L-band 2, UHF and VHF frequencies.

15. A computer readable medium including computer program instructions for use with a computer having at least one television tuner that receives and demodulates signals representing at least first and second digital television programs, the computer program instructions causing the computer to perform the steps of:

decoding the received television signals representing the first and second digital television programs into respective first and second digital television bit-streams;

decoding the first digital television bit-stream into first audio and video signals;

decoding the second digital television bit-stream into a baseband television signal;

providing the first video signal for display on a local display;

providing the baseband television signal for display at a remote location.

* * * * *